US011663725B2

(12) United States Patent
Gibbon et al.

(10) Patent No.: US 11,663,725 B2
(45) Date of Patent: *May 30, 2023

(54) SELECTING VIEWPOINTS FOR RENDERING IN VOLUMETRIC VIDEO PRESENTATIONS

(71) Applicant: AT&T Intellectual Property I, L.P., Atlanta, GA (US)

(72) Inventors: David Crawford Gibbon, Lincroft, NJ (US); Tan Xu, Bridgewater, NJ (US); Lee Begeja, Gillette, NJ (US); Bernard S. Renger, New Providence, NJ (US); Behzad Shahraray, Holmdel, NJ (US); Raghuraman Gopalan, Dublin, CA (US); Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/385,842

(22) Filed: Jul. 26, 2021

(65) Prior Publication Data

US 2021/0350552 A1 Nov. 11, 2021

Related U.S. Application Data

(63) Continuation of application No. 16/385,336, filed on Apr. 16, 2019, now Pat. No. 11,074,697.

(51) Int. Cl.
*G06T 7/246* (2017.01)
*H04N 21/25* (2011.01)
*H04N 21/218* (2011.01)

(52) U.S. Cl.
CPC ....... *G06T 7/246* (2017.01); *H04N 21/21805* (2013.01); *H04N 21/251* (2013.01); *G06T 2207/30241* (2013.01)

(58) Field of Classification Search
CPC .............. G06F 16/748; G06Q 30/0204; G06K 9/3241; H04N 7/181
See application file for complete search history.

(56) References Cited

U.S. PATENT DOCUMENTS 5,850,352 A 12/1998 Moezzi et al.
7,448,063 B2 11/2008 Freeman et al.
(Continued)

FOREIGN PATENT DOCUMENTS

JP 2016099941 A 5/2016
WO 2007124664 A1 11/2007
(Continued)

OTHER PUBLICATIONS

Stancil, Brian A., Cha Zhang, and Tsuhan Chen. "Active multicamera networks: From rendering to surveillance." IEEE Journal of selected topics in signal processing 2.4 (2008): 597-605. http://chenlab.ece.cornell.edu/Publication/Brian/stancil_DPVN2008.pdf.
(Continued)

*Primary Examiner* — Joshua L Schwartz

(57) ABSTRACT

One example of a method includes receiving a plurality of video streams depicting a scene, wherein the plurality of video streams provides images of the scene from a plurality of different viewpoints, identifying a target that is present in the scene, wherein the target is identified based on a determination of a likelihood of being of interest to a viewer of the scene, determining a trajectory of the target through the plurality of video streams, wherein the determining is based in part on an automated visual analysis of the plurality of video streams, wherein the determining is based in part on a visual analysis of the plurality of video streams, rendering a volumetric video traversal that follows the target through the scene, wherein the rendering comprises compositing the plurality of video streams, receiving viewer feedback
(Continued)

regarding the volumetric video traversal, and adjusting the rendering in response to the viewer feedback.

20 Claims, 3 Drawing Sheets

(56) References Cited

U.S. PATENT DOCUMENTS

| | | | |
|---|---|---|---|
| 7,593,602 | B2 | 9/2009 | Stentiford |
| 7,778,445 | B2 | 8/2010 | Au et al. |
| 7,830,381 | B2 | 11/2010 | Lundström et al. |
| 7,944,454 | B2 | 5/2011 | Zhou et al. |
| 8,009,864 | B2 | 8/2011 | Linaker et al. |
| 8,477,154 | B2 | 7/2013 | Davis et al. |
| 8,477,998 | B1 | 7/2013 | Kim et al. |
| 8,488,877 | B1 | 7/2013 | Owechko et al. |
| 8,705,876 | B2 | 4/2014 | Vaddadi et al. |
| 8,755,610 | B2 | 6/2014 | Holland et al. |
| 8,964,008 | B2 | 2/2015 | Bathiche |
| 9,064,309 | B2 | 6/2015 | Chaudhury et al. |
| 9,153,073 | B2 | 10/2015 | Langlotz et al. |
| 9,185,361 | B2 | 11/2015 | Curry |
| 9,196,021 | B2 | 11/2015 | Jin et al. |
| 9,214,030 | B2 | 12/2015 | Sole et al. |
| 9,258,531 | B2 | 2/2016 | Jia et al. |
| 9,361,727 | B2 | 6/2016 | Fuchs et al. |
| 9,363,569 | B1 | 6/2016 | Van Hoff et al. |
| 9,406,131 | B2 | 8/2016 | Würmlin et al. |
| 9,449,230 | B2 | 9/2016 | Han et al. |
| 9,495,764 | B1 | 11/2016 | Boardman et al. |
| 9,591,336 | B2 | 3/2017 | Cronin et al. |
| 9,794,495 | B1 | 10/2017 | Forsblom |
| 9,836,885 | B1 | 12/2017 | Eraker et al. |
| 9,918,110 | B2 | 3/2018 | Anwar et al. |
| 9,922,404 | B2 | 3/2018 | Lee et al. |
| 9,940,898 | B2 | 4/2018 | Cook et al. |
| 9,947,108 | B1 | 4/2018 | Chen |
| 9,973,711 | B2 | 5/2018 | Yang et al. |
| 9,986,221 | B2 | 5/2018 | Zhou |
| 10,127,643 | B2 | 11/2018 | Lee et al. |
| 11,012,675 | B2 | 5/2021 | Gibbon et al. |
| 2003/0023974 | A1 | 1/2003 | Dagtas et al. |
| 2008/0246759 | A1 | 10/2008 | Summers |
| 2009/0006937 | A1* | 1/2009 | Knapp ............... G06F 16/748 715/205 |
| 2011/0249090 | A1 | 10/2011 | Moore et al. |
| 2013/0208124 | A1* | 8/2013 | Boghossian ......... G06K 9/3241 348/159 |
| 2015/0104065 | A1 | 4/2015 | Park et al. |
| 2015/0226828 | A1 | 8/2015 | Davies et al. |
| 2016/0191893 | A1 | 6/2016 | Gewickey et al. |
| 2016/0198140 | A1 | 7/2016 | Nadler |
| 2016/0335748 | A1 | 11/2016 | Newson et al. |
| 2017/0061686 | A1 | 3/2017 | Yu |
| 2017/0180680 | A1 | 6/2017 | Yu |
| 2017/0195561 | A1 | 7/2017 | Hegelich et al. |
| 2017/0236549 | A1 | 8/2017 | Dittmer-Roche |
| 2017/0244948 | A1 | 8/2017 | Pang et al. |
| 2017/0244985 | A1 | 8/2017 | Masterson |
| 2017/0318275 | A1 | 11/2017 | Khalid et al. |
| 2017/0339341 | A1 | 11/2017 | Zhou et al. |
| 2018/0063514 | A1 | 3/2018 | Mizuno |
| 2018/0098131 | A1 | 4/2018 | Zhou |
| 2018/0131907 | A1 | 5/2018 | Schmirler et al. |
| 2018/0146216 | A1 | 5/2018 | Chang et al. |
| 2018/0164593 | A1 | 6/2018 | Van der Auwera et al. |
| 2018/0173957 | A1 | 6/2018 | Pavetic et al. |
| 2018/0213202 | A1 | 7/2018 | Kopeinigg et al. |
| 2018/0220048 | A1 | 8/2018 | Tamir et al. |
| 2018/0253884 | A1 | 9/2018 | Burnett, III et al. |
| 2018/0255332 | A1 | 9/2018 | Heusser |
| 2018/0302602 | A1 | 10/2018 | Chen et al. |
| 2018/0332218 | A1 | 11/2018 | Yoshimura |
| 2018/0342043 | A1 | 11/2018 | Vandrotti et al. |
| 2018/0342106 | A1 | 11/2018 | Rosado |
| 2018/0343387 | A1 | 11/2018 | Bostick et al. |
| 2018/0350146 | A1 | 12/2018 | Gervasio et al. |
| 2018/0359489 | A1 | 12/2018 | Lakshman et al. |
| 2018/0376217 | A1 | 12/2018 | Kahng et al. |
| 2019/0012844 | A1 | 1/2019 | Rao et al. |
| 2019/0051037 | A1 | 2/2019 | Chui et al. |
| 2019/0107845 | A1 | 4/2019 | Kaine |
| 2019/0200058 | A1 | 6/2019 | Hall et al. |
| 2019/0297376 | A1* | 9/2019 | McCarty ............ H04N 21/4318 |

FOREIGN PATENT DOCUMENTS

| | | | |
|---|---|---|---|
| WO | 2016029224 | A1 | 2/2016 |
| WO | 2017186649 | A1 | 11/2017 |
| WO | 2017201751 | A1 | 11/2017 |
| WO | 2017205642 | A1 | 11/2017 |
| WO | 2018036456 | A1 | 3/2018 |
| WO | 2018039646 | A1 | 3/2018 |
| WO | 2018055340 | A1 | 3/2018 |
| WO | 201810338 | A1 | 6/2018 |
| WO | 2018144315 | A1 | 8/2018 |
| WO | 2018175855 | A1 | 9/2018 |

OTHER PUBLICATIONS

Ballan, Luca, et al. "Unstructured video-based rendering: Interactive exploration of casually captured videos." ACM Transactions on Graphics (TOG). vol. 29. No. 4. ACM, 2010. ftp://ftp.idc.ac.il/Faculty/arik/Seminar2010/papers/VideoDepictions/videoExploration.pdf.

Narayanan, P. J., Peter W. Rander, and Takeo Kanade. "Constructing virtual worlds using dense stereo." IEEE, 1998. https://www.researchgate.net/profile/Peter_Rander/publication/3766361_Constructing_virtual_worlds_using_dense_stereo/links/55fa9fb808ae07629e0417dc/Constructing-virtual-worlds-using-dense-stereo.pdf.

Possegger, Horst, et al., "Robust real-time tracking of multiple objects by volumetric mass densities," Proceedings of the IEEE Conference on Computer Vision and Pattern Recognition. 2013. http://citeseerx.ist.psu.edu/viewdoc/download?doi=10.1.1.648.3459&rep=rep1&type=pdf.

Rematas, Konstantinos, et al., "Soccer on Your Tabletop," Proceedings of the IEEE Conference on Computer Vision and Pattern Recognition. 2018. http://grail.cs.washington.edu/projects/soccer/.

Landabaso, José Luis, and Montse Pardás, "Foreground regions extraction and characterization towards real-time object tracking," International Workshop on Machine Learning for Multimodal Interaction. Springer, Berlin, Heidelberg, 2005. http://landabaso.org/publications/mlmi-05-landabaso.pdf.

Shih, Huang-Chia, "A Survey of Content-Aware Video Analysis for Sports," IEEE Transactions on Circuits and Systems for Video Technology 28.5 (2018): 1212-1231. https://ieeexplore.ieee.org/stamp/stamp.jsp?arnumber=7827117.

"Nokia, AT&T and Jaunt Showcase 5G and Immersive Experiences," Telecom Review, telecomreviewna.com, Nov. 29, 2018. https://web.archive.org/web/20190203205836/http://www.telecomreviewna.com/index.php?option=com_content&view=article&id=2485:nokia-atat-and-jaunt-showcase-5g-and-immersive-experiences&catid=3:newsflash&Itemid=131.

"Immersive sports analysis," Viz Libero, vizrt.com, Feb. 3, 2019. https://web.archive.org/web/20190203205957/https://www.vizrt.com/products/viz-libero/.

Gupta, Abhinav, et al. "Estimating spatial layout of rooms using volumetric reasoning about objects and surfaces." Advances in neural information processing systems, 2010. http://papers.nips.cc/paper/4120-estimating-spatial-layout-of-rooms-using-volumetric-reasoning-about-objects-and-surfaces.pdf.

Jia, Yun-Tao, Shi-Min Hu, and Ralph R. Martin. "Video completion using tracking and fragment merging." The Visual Computer 21.8-10 (2005): 601-610. http://citeseerx.ist.psu.edu/viewdoc/download?doi=10.1.1.166.30&rep=rep1&type=pdf.

Cai, Haoye, et al. "Deep video generation, prediction and completion of human action sequences." Proceedings of the European

(56) References Cited

OTHER PUBLICATIONS

Conference on Computer Vision (ECCV). 2018. http://openaccess.thecvf.com/content_ECCV_2018/papers/Chunyan_Bai_Deep_Video_Generation_ECCV_2018_paper.pdf.

Patwardhan, Kedar A., Guillermo Sapiro, and Marcelo Bertalmio. "Video inpainting of occluding and occluded objects." IEEE International Conference on Image Processing 2005. vol. 2. IEEE, 2005. https://www.researchgate.net/profile/Kedar_Patwardhan2/publication/6534338_Video_Inpainting_Under_Constrained_Camera_Motion/links/0c96051e0323d67580000000/Video-Inpainting-Under-Constrained-Camera-Motion.pdf.

Zhang, Yunjun, Jiangjian Xiao, and Mubarak Shah. "Motion layer based object removal in videos." 2005 Seventh IEEE Workshops on Applications of Computer Vision (WACV/MOTION'05)—vol. 1. vol. 1. IEEE, 2005. http://citeseerx.ist.psu.edu/viewdoc/download?doi=10.1.1.75.7244&rep=rep1&type=pdf.

Kang, Kai, et al. "Object detection from video tubelets with convolutional neural networks." Proceedings of the IEEE conference on computer vision and pattern recognition. 2016. http://openaccess.thecvf.com/content_cvpr_2016/papers/Kang_Object_Detection_From_CVPR_2016_paper.pdf.

* cited by examiner

SELECTING VIEWPOINTS FOR RENDERING IN VOLUMETRIC VIDEO PRESENTATIONS

This application is a continuation of U.S. patent application Ser. No. 16/385,336, filed on Apr. 16, 2019, now U.S. Pat No. 11,074,697, which is herein incorporated by reference in its entirety.

The present disclosure relates generally to video technology, and relates more particularly to systems, non-transitory computer-readable media, and methods for selecting viewpoints for rendering in volumetric video presentations.

BACKGROUND

Volumetric video uses a plurality of cameras to capture a 360 degree field of view of a scene. Unlike traditional 360 degree video that is used for applications like virtual reality, gaming, and the like, however, volumetric video is captured from the outside, in. When viewing a volumetric video scene, a viewer may view the scene from any angle (including the middle of the scene), may zoom in or out of the scene, or may view the scene from different perspectives within the scene. The scene may also be viewed in two or three dimensions (e.g., using traditional two-dimensional television displays, three dimensional television displays, head mounted displays, and the like). As such, volumetric video techniques may be used to enhance the viewing experience.

SUMMARY

The present disclosure describes a device, computer-readable medium, and method for selecting viewpoints for rendering in volumetric video presentations. In one example, a method includes receiving a plurality of video streams depicting a scene, wherein the plurality of video streams provides images of the scene from a plurality of different viewpoints, identifying a target that is present in the scene and that is likely to be of interest to a viewer of the scene, determining a trajectory of the target through the plurality of video streams, wherein the determining is based in part on an automated visual analysis of the plurality of video streams, rendering a volumetric video traversal that follows the target through the scene, wherein the rendering comprises compositing the plurality of video streams, receiving viewer feedback regarding the volumetric video traversal, and adjusting the rendering in response to the viewer feedback.

In another example, a non-transitory computer-readable storage medium stores instructions which, when executed by a processor, cause the processor to perform operations. The operations include receiving a plurality of video streams depicting a scene, wherein the plurality of video streams provides images of the scene from a plurality of different viewpoints, identifying a target that is present in the scene and that is likely to be of interest to a viewer of the scene, determining a trajectory of the target through the plurality of video streams, wherein the determining is based in part on an automated visual analysis of the plurality of video streams, rendering a volumetric video traversal that follows the target through the scene, wherein the rendering comprises compositing the plurality of video streams, receiving viewer feedback regarding the volumetric video traversal, and adjusting the rendering in response to the viewer feedback.

In another example, a system includes a processor deployed in a telecommunication service provider network and a non-transitory computer-readable storage medium stores instructions which, when executed by the processor, cause the processor to perform operations. The operations include receiving a plurality of video streams depicting a scene, wherein the plurality of video streams provides images of the scene from a plurality of different viewpoints, identifying a target that is present in the scene and that is likely to be of interest to a viewer of the scene, determining a trajectory of the target through the plurality of video streams, wherein the determining is based in part on an automated visual analysis of the plurality of video streams, rendering a volumetric video traversal that follows the target through the scene, wherein the rendering comprises compositing the plurality of video streams, receiving viewer feedback regarding the volumetric video traversal, and adjusting the rendering in response to the viewer feedback.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
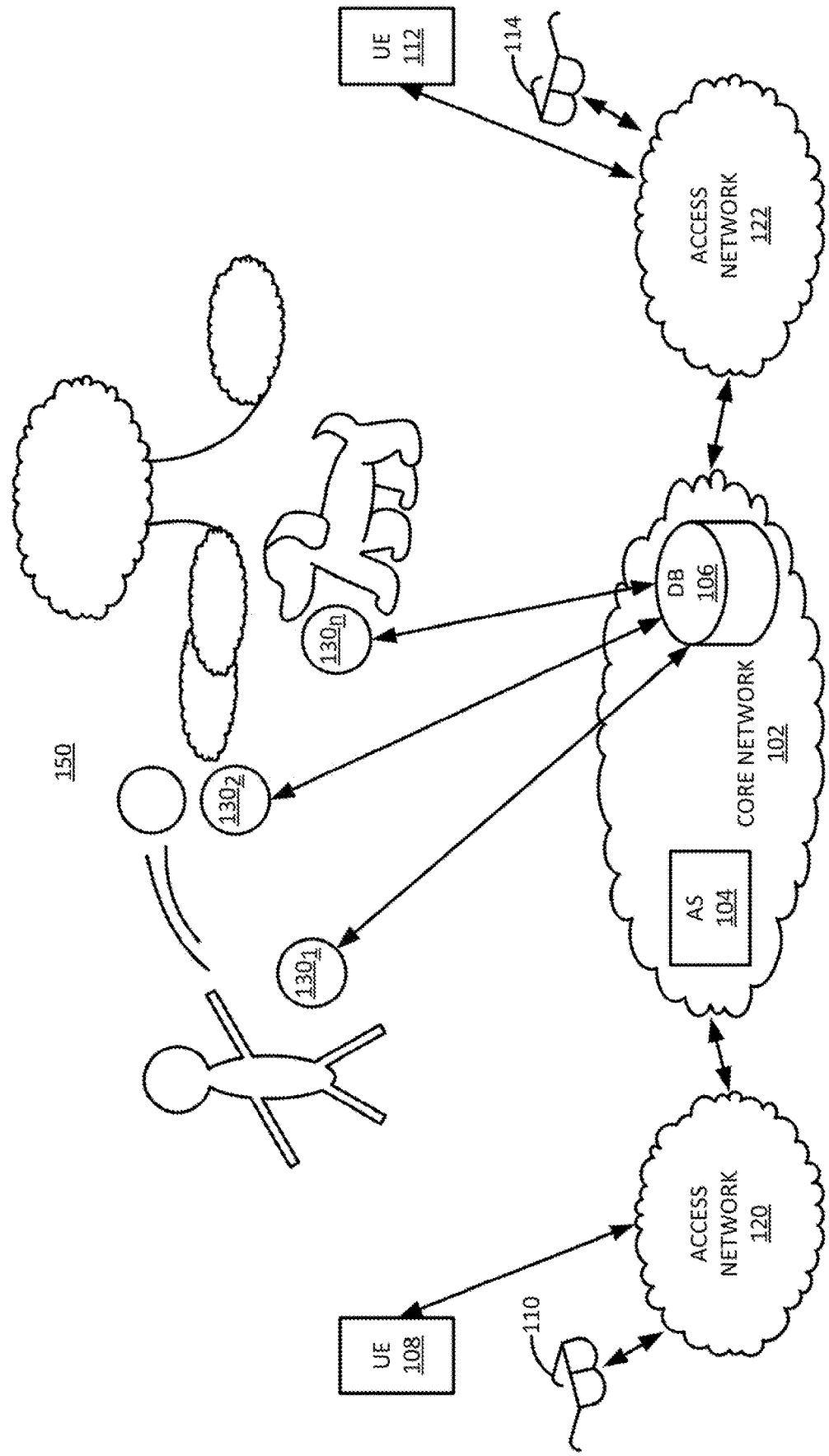
FIG. 1 illustrates an example system in which examples of the present disclosure for selecting viewpoints for rendering in volumetric video presentations may operate.

In one example, the present disclosure provides systems, non-transitory computer-readable media, and methods for selecting viewpoints for rendering in volumetric video presentations. As discussed above, volumetric video techniques may be used to enhance the viewing experience of visual media and events, such as movies, television shows, video games, extended reality applications (e.g., training exercises), and sporting events, by making the experience more immersive. However, because a volumetric video may be viewed from any angle at any time, the number of potential traversals (e.g., continuous sequences of viewpoints) through a volumetric video presentation may be virtually infinite. Rendering even a single volumetric video traversal for viewing is a time consuming and computationally intensive process; thus, rendering all possible traversals is infeasible, particularly considering many of those traversals may not even be viewed if the traversals do not contain content that viewers actually want to see. Moreover, sending multiple traversals to a single endpoint device may consume more network bandwidth than is necessary.

Examples of the present disclosure automatically detect viewpoints that may be of interest to a viewer of a volumetric video presentation. For instance, in one example, potential targets (e.g., individuals, objects, locations, or actions of interest, which may be user-defined) to track through the volumetric video presentation may be initially identified based on historical viewing data. The historical viewing data may include targets that a specific viewer has followed through similar, previous volumetric video presentations (e.g., if the volumetric video presentation is a sporting event, the specific viewer may have followed specific players during similar sporting events), targets that groups of viewers have followed through similar, previous volumetric video presentations (e.g., viewers whose ages fall within a particular range may often follow targets of a similar nature), targets which have received high numbers of followers through similar, previous volumetric video presentations (e.g., if the volumetric video presentation is a sporting event, specific players may tend to attract the most interest from viewers), and/or targets that are predefined, e.g., by the creator of the volumetric video presentation, by advertisers, or the like (e.g., the creator of the volumetric video presentation may wish to present specific viewpoints for artistic purposes).

Further examples of the present disclosure may adaptively refine a list of potential targets according to data contained in viewer profiles, explicit viewer requests, user-generated content (e.g., content shared by social media users), and/or user feedback (both implicit and explicit). User feedback in particular may help examples of the present disclosure to improve the detection of potential targets when rendering traversals of future volumetric video targets.

The number of traversals that is rendered can subsequently be limited to traversals that follow the targets. In other words, rather than render all possible traversals through a volumetric video presentation, examples of the present disclosure may limit rendering to a select number of traversals that are expected to be of the most interest to viewers. Thus, viewers can be provided with an immersive experience, while computing resources are conserved.

Within the context of the present disclosure, a "viewpoint" in a volumetric video may comprise a specific combination of viewing angle, degree of magnification (i.e., zoom), and/or perspective. Furthermore, the physical environment or space that is depicted in the volumetric video may be represented in the volumetric video as a plurality of "voxels" having positional coordinates (e.g., X, Y, Z with respect to a reference point), color information (e.g., red, green, blue values and/or cyan, magenta, yellow values), transparency information (e.g., zero to 100 percent), shading information, texture information, and so forth. In one example, the set of information values for respective voxels may change from one frame of the volumetric video to the next, e.g., as objects move through the physical environment(s), as lighting or other environmental conditions change, and so forth.

To further aid in understanding the present disclosure, FIG. 1 illustrates an example system 100 in which examples of the present disclosure for selecting viewpoints for rendering in volumetric video presentations may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, an enterprise network comprising infrastructure for computing and providing communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Network 102 may further comprise a broadcast television network, e.g., a traditional cable provider network or an Internet Protocol Television (IPTV) network, as well as an Internet Service Provider (ISP) network. In one example, network 102 may include a plurality of television servers (e.g., a broadcast server, a cable head-end), a plurality of content servers, an advertising server, an interactive TV/video on demand (VoD) server, and so forth.

Figure 3:
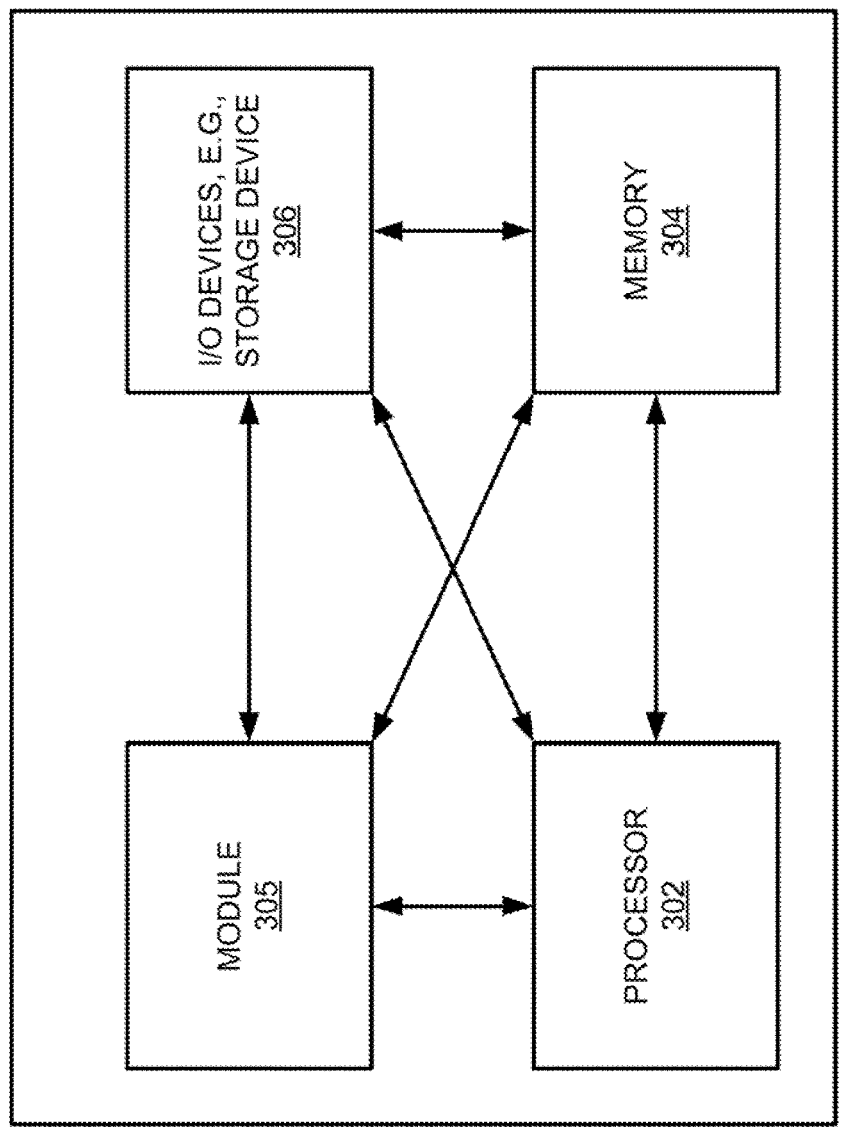
FIG. 3 depicts a high-level block diagram of a computing device specifically programmed to perform the functions described herein.

In accordance with the present disclosure, application server (AS) 104 may comprise a computing system or server, such as computing system 300 depicted in FIG. 3, and may be configured to provide one or more operations or functions for selecting viewpoints for rendering in volumetric video presentations, as described herein. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

The AS 104 may be communicatively coupled to a database (DB) 106. The DB 106 may store data that is used by the AS 104 to perform operations or functions for selecting viewpoints for rendering in volumetric video presentations, as described herein. For instance, the DB 106 may store data including profiles of viewers (network users). The profiles may identify objects, individuals, actions, or locations that are of interest to the viewers (e.g. potential targets to track through volumetric video presentations). These objects, individuals, or locations may include objects, individuals, actions, or locations that the viewers have tracked through previous volumetric video presentations. The DB 106 may also store user-generated content, such as images, video, and the like which are generated and shared by network end-users (e.g., via social media or other means). For instance, the DB 106 may comprise a repository of videos uploaded by users of a video sharing site.

In a further example, the DB 106 may store a library of volumetric videos, a 2D video library, an image library, a plurality of 2D object detection/recognition models (e.g., machine learning-based image detection models), a catalog matching 2D objects to 3D object models, viewer preferences for prioritization of certain objects, topics, and/or regions of focus for rendering volumetric videos, and so forth that may be processed by AS 104 in connection with selecting viewpoints for rendering in volumetric video presentations. DB 106 may further store additional information such as a lexicon of topic models, e.g., machine learning-based models to identify topics and/or themes in 2D and/or volumetric video, and so forth.

In a further example, the DB 106 may store video streams that are generated by a plurality of video capture devices, e.g., two-dimensional and/or three-dimensional cameras, such as cameras 1301-130$n$ (hereinafter also referred to individually as a "camera 130" or collectively as "cameras 130"). The physical locations of cameras 130 may be geographically distributed throughout a scene 150. The scene 150 may be, for instance, a movie or television set, a sports venue, or any other locations from which video may be captured. The scene 150 may also be a "virtual" scene, such as a computer-generated scene (e.g., as in the case of a video game). In this case, the cameras 130 may comprise a virtual camera system rather than a plurality of physical cameras. Although FIG. 1 illustrates three cameras 130, any number of cameras 130 may be distributed throughout the scene 150.

In one example, the positions of at least some of the cameras 130 within the scene 150 may be fixed. However, in other examples, at least some of the cameras 130 may be mounted to robots, unmanned aerial vehicles (UAVs), or other mechanisms that allow the cameras' positions to be adjusted dynamically. Each camera 130 may be positioned to capture a different perspective (e.g., a different orientation and/or viewpoint) within the scene 150. Some of these perspectives may overlap. Thus, in one example, the cameras 130 may be positioned to collectively provide a 360 degree view of the scene 150. A volumetric video may then be composited from the videos obtained from the cameras 130. For instance, the AS 104 may retrieve the videos from the database and composite at least some of the videos to create a volumetric video traversal.

In a further example, AS 104 may comprise a physical storage device (e.g., a database server), to store various types of information in support of systems for selecting viewpoints for rendering in volumetric video presentations, in accordance with the present disclosure. For example, AS 104 may store any or all of the information stored by the DB 106. In a further example still, the AS 104 may acquire video streams directly from the cameras 130, rather than from the DB 106. For instance, the cameras 130 may stream video of a live event (e.g., a sporting event, a concert, or the like) directly to the AS 104, which may generate volumetric video traversals of the live event in real time (e.g., as the AS 104 receives the video streams, subject to any network latency).

Although only a single application server (AS) 104 and a single database (DB) 106 are illustrated in FIG. 1, it should be noted that any number of servers and databases may be deployed. For instance, a plurality of servers and databases may operate in a distributed and/or coordinated manner as a processing system to perform operations for selecting viewpoints for rendering in volumetric video presentations, in accordance with the present disclosure. For ease of illustration, various additional elements of network 102 are omitted from FIG. 1.

As referred to herein, a machine learning model (MLM) (or machine learning-based model) may comprise a machine learning algorithm (MLA) that has been "trained" or configured in accordance with input data (e.g., training data) to perform a particular service, e.g., to predict viewpoints that are likely to be of interest to viewers of volumetric video presentations. Examples of the present disclosure are not limited to any particular type of MLA/model, but are broadly applicable to various types of MLAs/models that utilize training data, such as support vector machines (SVMs), e.g., linear or non-linear binary classifiers, multi-class classifiers, deep learning algorithms/models, decision tree algorithms/models, k-nearest neighbor (KNN) clustering algorithms/models, and so forth.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and others may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

In one example, the access network 120 may be in further communication with a plurality of user endpoint devices (UEs), such as devices 108 and 110. Similarly, access network 122 may be in further communication with a plurality of user endpoint devices (UEs), such as devices 112 and 114. In one example, UEs 108-114 may each comprise a mobile device, a cellular smart phone, a wearable computing device (e.g., smart glasses, augmented reality glasses, head mounted displays, or headsets), a digital camera, a web-camera, a home-based or business-based security camera, a remote controlled and/or automated drone (with one or more cameras), a personal computer (e.g., a laptop, a tablet computer, a desktop computer, etc.), a bank or cluster of such devices, and the like. In a further example, each of the UEs 108-114 includes or is communicatively coupled to a display that is capable of displaying volumetric video. For instance, UEs 110 and 114 specifically comprise head mounted displays of the type that may be used to view volumetric video presentations. In one example, UEs 108-114 may each comprise programs, logic or instructions for performing functions in connection with examples of the present disclosure for selecting viewpoints for rendering in volumetric video presentations. For example, devices 108-114 may each comprise a computing system or device, such as computing system 300 depicted in FIG. 3, and may be configured to provide one or more operations or functions in connection with examples of the present disclosure for selecting viewpoints for rendering in volumetric video presentations, as described herein.

In one example, the AS 104 may identify individuals, actions, locations, and/or objects of interest (hereinafter referred to as "targets") depicted in the videos obtained from the cameras 130. The targets may be specified by a viewer of the volumetric video presentation (e.g., via an explicit request related to a specific volumetric video presentation, or via stored preferences, profiles, or viewing history). For instance, where the volumetric video presentation depicts a sporting event, the viewer may wish to follow a particular player, coach, official, or the like. Alternatively, the viewer may wish to view all instances of a certain action, such as kicking, blocking, throwing, catching, hitting, running, jumping, sliding, shooting, checking, punching, swinging, or the like. The viewer may also wish to follow a particular object, such as a ball, a bat, a puck, or a club, or a particular location such as a goal, a base, a hole, or a specific region of a field. The AS 104 may also learn or predict targets, for example through analysis of thematically similar materials such as movies, television shows, sporting events, and even user-generated content. Prediction of targets can also be based on viewer demographics (e.g., what other viewers in a common age range prefer to view), popular targets (e.g., most requested targets or most followed traversals), or other means. Prediction of targets may employ the use of machine learning techniques or models to learn potential targets based on the historical viewership or popularity of previous targets. In one embodiment, authorizations pertaining to the tracking of targets may have to be received prior to the implementation of tracking. For example, event organizers may have obtained such prior authorizations from the musicians, actors, athletes and the like, who are performing at the events. However, spectators attending the events may not want to be uniquely tracked unless the spectators provide specific authorizations (e.g., opt-in for such tracking, e.g., authorizing a drone with a camera hovering over the spectators and the like). However, in certain scenarios, the spectators may implicitly authorize incidental tracking, e.g., in the example where a tracked ball passes in front of one or more spectators, or a live performer passing in front of a crowd of spectators such as a stage (e.g., authorization is given through the purchase of a ticket for the live events where such incidental capture of the spectators may occur).

In another example, the prediction of targets can be machine-learned to determine which targets are behaving in an anomalous or atypical fashion. In other words, the machine learning model may learn to predict that objects that do not behave as expected may be of interest to a viewer (and thus should be identified as potential targets). For instance, if a ball is hit far afield from a typical location (e.g., far to the left instead of straight ahead), this specific anomaly may lead to the machine learning model predicting the ball to be a target of interest.

The AS 104 may track the targets through the videos obtained from the cameras 130 and may generate a composite of the videos in the form of a traversal (e.g., a continuous sequence of viewpoints) through the volumetric video. A plurality of different traversals may be generated by the AS 104 in a similar manner for a plurality of different targets. Once the traversals are established, a viewer, e.g., via one of the UEs 108-114, may then obtain a presentation of the volumetric video from AS 104 that follows one of the traversals. The viewer may also "jump" from one traversal to another, different traversal at any time while viewing the volumetric video presentation.

For instance, AS 104 may create a two or three dimensional output video, e.g., a projection/traversal of the three dimensional space of the volumetric video, and stream or otherwise transmit the output video to the UEs 108-114. Alternatively, or in addition, the volumetric video may be provided to the UEs 108-114, and the UEs 108-114 may render the volumetric video in accordance with the display capabilities of the UEs 108-114. For example, the viewer may select one or more perspectives, targets, or the like from within the space of the volumetric video (e.g., within the scene 150) from which to render the output video. For instance, a user interface of one of the UEs 108-114 may enable the viewer to move a viewpoint left/right, up/down, forward/backward, etc., to select coordinates or define a position with respect to a reference point in the scene 150, and so forth. The viewpoint could also be moved via an input/output (I/O) device such as a joystick or automatically moved in response to movement of the viewer's gaze or spoken viewer commands. In addition, in a server-based example, the AS 104 may also store the output video that is created. Similarly, the AS 104 may provide the volumetric video or/traversal of the 3D space of the volumetric video to an endpoint device (not shown) for controlling one or more of the cameras 130.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. In one example, the system 100 may further include wireless or wired connections to sensors, radio frequency identification (RFID) tags, or the like from which devices may determine locations/positions, ranges/distances, bearings, and so forth within the scene 150. Thus, these and other modifications are all contemplated within the scope of the present disclosure.

Figure 2:
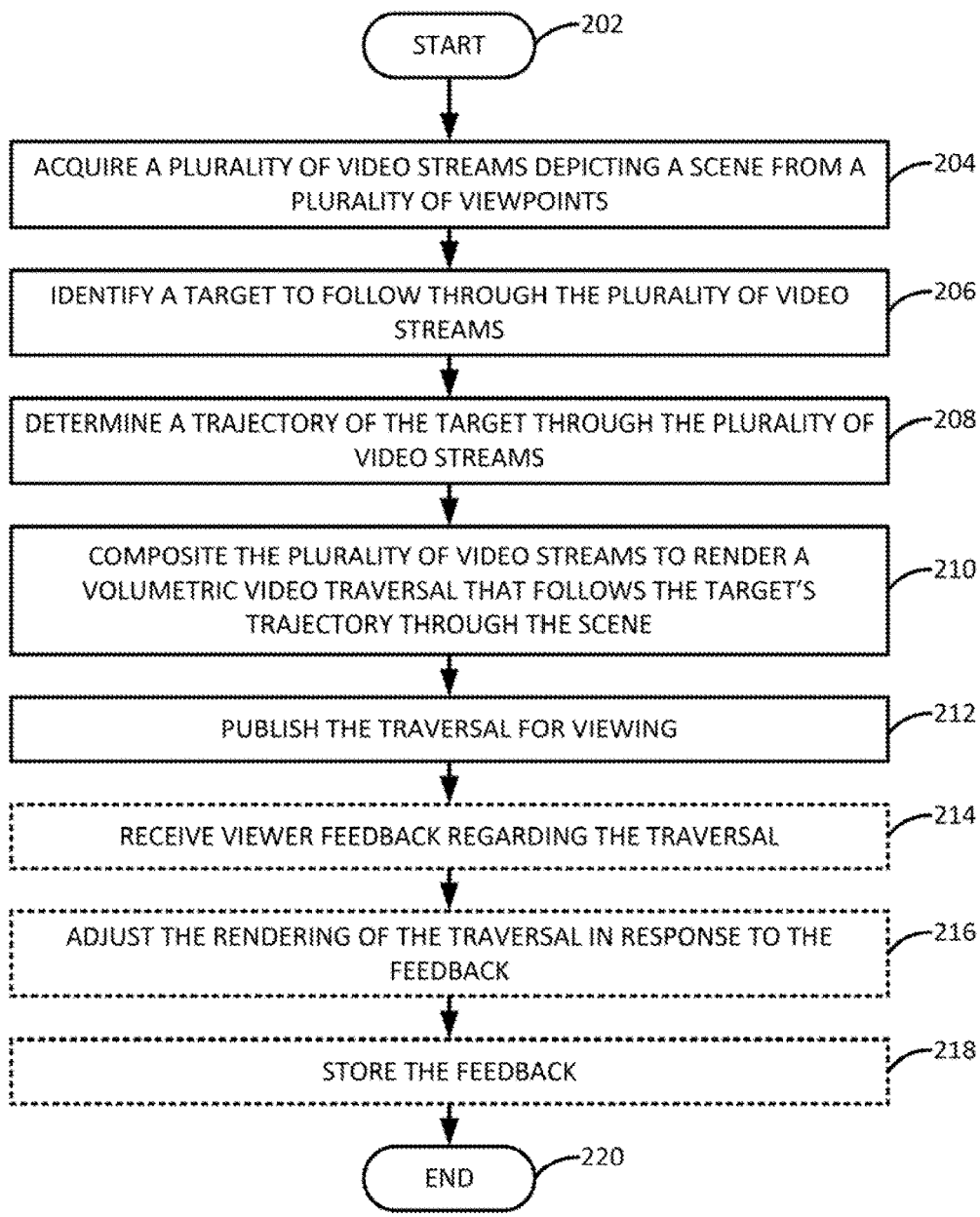
FIG. 2 illustrates a flowchart of an example method for selecting viewpoints for rendering in volumetric video presentations.

FIG. 2 illustrates a flowchart of an example method 200 for selecting viewpoints for rendering in volumetric video presentations. In one example, the method 200 may be used to select viewpoints or targets appearing the volumetric video presentations when network conditions are stable (e.g., the measured latency does not vary with higher than a threshold standard deviation, where the threshold standard deviation may be, for instance, thirty milliseconds). The steps, functions, or operations of the method 200 may be performed, for example, by the AS 104 and/or one or the wearable UEs 110 or 114 illustrated in FIG. 1. For instance, if a wearable display device has a sufficiently powerful processor, the wearable display device may perform all steps of the method 200. Alternatively, to conserve processing power, the wearable display device may offload some of the more processing intensive steps of the method 200 to a remote application server, e.g., AS 104.

In another example, the steps, functions, or operations of method 200 may be performed by a computing device or system 300, and/or processor 302 as described in connection with FIG. 3 below. Similarly, in one example, the steps, functions, and/or operations of the method 200 may be performed by a processing system comprising one or more computing devices collectively configured to perform various steps, functions, and/or operations of the method 200. For instance, multiple instances of the computing device or processing system 300 may collectively function as a distributed processing system. For illustrative purposes, the method 200 is described in greater detail below in connection with an example performed by a processor, such as processor 302.

The method 200 begins in step 202. In step 204, the processor may begin to acquire a plurality of video streams depicting a scene. The plurality of video streams may all depict the same scene, but from a plurality of different viewpoints. The scene may comprise, for example, a movie or television set, a sports venue, or another location. In one example, the video streams are acquired from a database which stores a plurality of pre-recorded video streams. In this example, the volumetric video presentation may comprise pre-recorded media. However, in another example, the video streams are acquired directly from the cameras that record the video streams. In this example, the volumetric video presentation may comprise a live event (e.g., a sporting event, a concert, or the like). Also, in this example, the plurality of video streams may be acquired in real time (i.e., as the cameras capture the video streams and as a live event is occurring, subject to any latency introduced by network conditions).

In step 206, the processor may identify a target to follow through the plurality of video streams. As discussed above, the target may comprise an object, an individual, an action, or a location whose movements through the scene are to be visually tracked by a traversal. As also discussed above, there are numerous ways in which a target could be identified. For instance, in one example, the target may be identified or selected based on historical viewership information. This historical viewership information may include targets that a specific viewer or that a group of viewers (who may share some similarities with the specific viewer, such as age, gender, place of residence, or the like) followed in another media presentation that is thematically similar to the volumetric video presentation. For instance, if the volumetric video presentation comprises a football game, and residents of a particular geographic area have shown a preference for viewing traversals that follow a particular team's quarterback during football games, then a specific viewer who also lives in that particular geographic area may also wish to view traversals that follow the particular team's quarterback.

In another example, the target may be provided by the viewer. For instance, a specific viewer may send an explicit request to the processor to generate a traversal that follows a specific target. As an example, if the volumetric video presentation is a movie, the specific viewer may send a request to the processor that asks for a traversal following a specific character in the movie. Alternatively, the specific viewer may be associated with a stored profile that is accessible to the processor. The stored profile may indicate the specific viewer's preferences or history with respect to the types of targets in which the specific viewer is interested. For instance, if the specific viewer viewed a traversal that followed a specific character through a volumetric video presentation of a movie, the specific viewer may wish to view a traversal that follows the same specific character through a sequel to the movie.

In another example, the target may be identified from a list of previous viewer-requested targets. For instance, the volumetric video presentation may comprise an episode of a television show. In a previous episode of the television show, a number of traversals based on viewer-requested targets may have been generated and made available for viewing by any interested viewers. In this case, the target that was the subject of the most popular (e.g., most watched, most shared, most liked) traversal may be automatically selected as a target in a new episode of the television show.

In another example still, the target may be requested by a creator of or by another entity involved in the production of the media that comprises the volumetric video traversal. For instance, if the volumetric video presentation is a video game, the creator or publisher of the video game may request the traversals following specific video game characters be created.

In step 208, the processor may determine the trajectory of the target through the plurality of video streams. For instance, the processor may analyze the plurality of video streams for appearances of the target. The target may be identified in the video streams using object, facial, text/character, or other recognition techniques. As an example, if the target is an individual (i.e., a human target), then facial recognition techniques may be used to analyze the video streams for the appearance of the target. If the target is a particular location on the sideline of a football field, text/character recognition techniques may be used to analyze the video streams for the appearance of objects (e.g., yard markers, signage, etc.) displaying the yard lines of the field. If the target is a vehicle (e.g., a sports car), object recognition techniques may be used to analyze the video streams for the presence of the vehicle. In other examples, predefined targets may carry tracking devices, such as radio frequency identification (RFID) tags or other devices with unique device identifiers or signatures, which allow the targets to be easily identified in the video streams.

In one example, determination of the target's trajectory may involve determining not just when and where the target appears in the video streams, but also how the target appears. For instance, cinematographic effects or styles (e.g., zoom, movement, color, lighting, depth of field, and the like) may also be taken into account.

In step 210, the processor may composite the plurality of video streams to render a traversal of the volumetric video presentation that follows the target's trajectory through the scene. For instance, the processor may employ a mesh-based technique (e.g., in which a static three dimensional mesh representation of a scene may be generated and subsequently enhanced with computer generated techniques), a point-based technique (e.g., in which image data captured by the cameras may be represented as points in a three-dimensional space), a combination of mesh-based and point-based techniques, or other techniques used to produce volumetric video to render the traversal.

In one example, compositing of the plurality of video streams may also involve identification of potential locations for advertising or other materials. For instance, inclusion of video streams displaying a certain depth of field or zooming in on certain objects may provide opportunities for product placements. In another example, video streams may be selected for compositing that follow the target but omit any subject matter that the viewer does not want to see (e.g., subject matter that the viewer wishes to be filtered out). For instance, a first video stream may depict a zoomed-in view of a scene that focuses directly on the target, while a second video stream may depict a zoomed-out view of the same scene that focuses less directly on the target. If the zoomed-out view depicts subject matter that the viewer has requested be filtered out (e.g., violence, injuries, collisions, inappropriate behaviors, and the like), but this subject matter is not visible in the first video stream, then the first video stream may be selected for compositing.

In one example, the traversal may be rendered in multiple formats, including two-dimensional and three-dimensional formats. This may allow user endpoint devices that are not capable of displaying video in three dimensions or in 360 degrees to still display viewer-oriented viewpoints.

In step 212, the processor may publish the traversal for viewing on user endpoint devices. For instance, the processor may publish a list or menu of available traversals of the volumetric video presentation, where a viewer may interact with the list or menu and select any of the published traversals for viewing. In response to a viewer selection of a traversal, the processor may stream the selected traversal to the viewer's endpoint device. In one example, the traversal can be viewed on an endpoint device as the traversal is being created.

In optional step 214, the processor may receive viewer feedback regarding the traversal. The viewer feedback may be explicitly provided (e.g., via the viewer liking, sharing, or otherwise rating or reviewing the traversal). The viewer feedback may also be implicitly provided (e.g., via the viewer viewing the traversal or not viewing the traversal or jumping to a traversal that follows a different target). In one example, the viewer feedback may include requests for modifications to the traversal (e.g., content to filter out, changes to the lighting, changes to the target, etc.). This allows the traversal to be personalized for each individual viewer who may view the traversal.

In optional step 216 (illustrated in phantom), the processor may adjust rendering of the traversal in response to the feedback. Adjustment of the rendering may involve repeating one or more of the steps above. For instance, the adjustment may include changing the target that the traversal follows. The adjustment may alternatively or additionally include changing the video streams that are selected for compositing (e.g., based on cinematographic effects, availability for advertising, or other factors). Where the volumetric video presentation depicts a live event, the adjustment may include sending instructions to one or more movable cameras to capture a different viewpoint. Instructions may also be sent to fixed cameras to adjust their capture settings (e.g., zoom, resolution, lighting, etc.).

In optional step 218 (illustrated in phantom), the processor may store the feedback for future reference. For instance, the feedback may be used to train a machine learning model that is used to identify targets and/or to select video streams for compositing, so that future traversals that are automatically rendered better adhere to a specific viewer's (or to a group of viewers') preferences.

The method 200 may end in step 220. The method 200 may be repeated any number of times for any number of scenes, where each scene may comprise a portion of the same volumetric video presentation.

Thus, the method 200 automatically detects viewpoints or traversals in a volumetric video presentation that may be of interest to a viewer (or group of viewers). A list of potential targets may be initially predicted and adaptively refined according to data contained in viewer profiles, explicit viewer requests, user-generated content (e.g., content shared by social media users), and/or user feedback (both implicit and explicit). Subsequently, traversals of the volumetric video presentation may be rendered that follow the identified targets. By identifying targets that are likely to be of interest to viewers, the resources used for rendering traversals of the volumetric video presentation may be conserved. For instance, rather than rendering all possible traversals through the volumetric video presentation, which would consume a tremendous amount of computing resources, the method 200 may limit rendering to a select number of traversals that are expected to be of the most interest to viewers.

Further examples of the disclosure could be used to render traversals that provide a composite of the highlights or most exciting views of the volumetric video presentation, where these highlights may not occur in a continuous or sequential manner. For instance, where the volumetric video presentation comprises a football game, the traversal may comprise a volumetric video composite of all scoring plays throughout the course of the game, even though the scoring plays may involve different players, locations, and the like.

Further examples of the disclosure could be used to render traversals that avoid obstacles or collisions in a surrounding environment. For instance, the volumetric video presentation may comprise an extended reality overlay that can be presented over a real time image of an environment in which a human, an unmanned vehicle, a robot, or the like is attempting to perform a task. Identifying traversals that avoid obstacles may help to ensure successful performance of the task while minimizing injury.

Although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 3 depicts a high-level block diagram of a computing device specifically programmed to perform the functions described herein. For example, any one or more components or devices illustrated in FIG. 1 or described in connection with the method 200 may be implemented as the system 300. For instance, a wearable display device or an application server could be implemented as illustrated in FIG. 3.

As depicted in FIG. 3, the system 300 comprises a hardware processor element 302, a memory 304, a module 305 for selecting viewpoints for rendering in volumetric video presentations, and various input/output (I/O) devices 306.

The hardware processor 302 may comprise, for example, a microprocessor, a central processing unit (CPU), or the like. The memory 304 may comprise, for example, random access memory (RAM), read only memory (ROM), a disk drive, an optical drive, a magnetic drive, and/or a Universal Serial Bus (USB) drive. The module 305 for selecting viewpoints for rendering in volumetric video presentations may include circuitry and/or logic for performing special purpose functions relating to streaming volumetric video content. The input/output devices 306 may include, for example, a camera, a video camera, storage devices (including but not limited to, a tape drive, a floppy drive, a hard disk drive or a compact disk drive), a receiver, a transmitter, a speaker, a microphone, a transducer, a display, a speech synthesizer, a haptic device, a sensor, an output port, or a user input device (such as a keyboard, a keypad, a mouse, and the like).

Although only one processor element is shown, it should be noted that the dedicated computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for selecting viewpoints for rendering in volumetric video presentations (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for selecting viewpoints for rendering in volumetric video presentations (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a disclosed example should not be limited by any of the above-described examples, but should be defined only in accordance with the following claims and their equivalents.

What is claimed is:

1. A method comprising:
receiving, by a processor, a plurality of video streams depicting a scene, wherein the plurality of video streams provides images of the scene from a plurality of different viewpoints;
identifying, by the processor, a target that is present in the scene, wherein the target is identified based on a determination of a likelihood of being of interest to a viewer of the scene;
determining, by the processor, a trajectory of the target through the plurality of video streams, wherein the determining is based in part on an automated visual analysis of the plurality of video streams;
rendering, by the processor, a volumetric video traversal that follows the target through the scene, wherein the rendering comprises compositing the plurality of video streams;
receiving, by the processor, viewer feedback regarding the volumetric video traversal; and
adjusting, by the processor, the rendering in response to the viewer feedback, wherein the adjusting comprises sending an instruction to a camera instructing the camera to capture images of the scene using a new setting, wherein the new setting comprises at least one of: a zoom setting, a resolution setting, or a lighting setting.

2. The method of claim 1, wherein the target is an object.

3. The method of claim 1, wherein the target is an individual.

4. The method of claim 1, wherein the target is a location.

5. The method of claim 1, wherein the target is an action.

6. The method of claim 1, wherein the identifying comprises:
identifying, by the processor, a preference for the target in a stored profile associated with the viewer.

7. The method of claim 1, wherein the identifying comprises:
receiving, by the processor, a request from the viewer to follow the target.

8. The method of claim 1, wherein the identifying comprises:
identifying, by the processor, a group of viewers who share a similarity with the viewer; and
selecting, by the processor, an item for which the group of viewers have previously expressed a preference as the target.

9. The method of claim 1, wherein the identifying comprises:
selecting, by the processor, an item that was previously of interest to the viewer in a media that is thematically similar to the scene as the target.

10. The method of claim 1, wherein the identifying comprises:
selecting, by the processor, a viewer-requested target from a previous scene as the target.

11. The method of claim 1, wherein the identifying comprises:
receiving, by the processor, a request from a creator of the scene to follow the target.

12. The method of claim 1, wherein the rendering comprises:
selecting, by the processor, a subset of the plurality of video streams that presents the target in a manner consistent with a preference of the viewer; and
performing, by the processor, the compositing using the subset.

13. The method of claim 12, wherein the preference comprises a preference with respect to a cinematographic effect.

14. The method of claim 12, wherein the preference comprises a preference with respect to a subject matter the viewer does not want to see.

15. The method of claim 12, wherein the adjusting further comprises:
selecting, by the processor, a new subset of the plurality of video streams in response to the viewer feedback; and
performing, by the processor, the compositing using the new subset.

16. The method of claim 1, wherein the adjusting further comprises:
identifying, by the processor, a new target that is present in the scene, wherein the new target is identified based on a new determination of a likelihood of being of interest to the viewer of the scene;
determining, by the processor, a new trajectory of the new target through the plurality of video streams, wherein the determining the new trajectory is based in part on a visual analysis of the plurality of video streams; and
adjusting, by the processor, the rendering so that the volumetric video traversal now follows the new target through the scene.

17. The method of claim 1, further comprising:
selecting, by the processor, a new target in a new scene, in response to the viewer feedback.

18. A non-transitory computer-readable storage medium storing instructions which, when executed by a processor, cause the processor to perform operations, the operations comprising:
receiving a plurality of video streams depicting a scene, wherein the plurality of video streams provides images of the scene from a plurality of different viewpoints;
identifying a target that is present in the scene, wherein the target is identified based on a determination of a likelihood of being of interest to a viewer of the scene;
determining a trajectory of the target through the plurality of video streams, wherein the determining is based in part on an automated visual analysis of the plurality of video streams;
rendering a volumetric video traversal that follows the target through the scene, wherein the rendering comprises compositing the plurality of video streams;
receiving viewer feedback regarding the volumetric video traversal; and
adjusting the rendering in response to the viewer feedback, wherein the adjusting comprises sending an instruction to a camera instructing the camera to capture images of the scene using a new setting, wherein the new setting comprises at least one of: a zoom setting, a resolution setting, or a lighting setting.

19. A system comprising:
a processor deployed in a telecommunication service provider network; and
a non-transitory computer-readable medium storing instructions which, when executed by the processor, cause the processor to perform operations, the operations comprising:
receiving a plurality of video streams depicting a scene, wherein the plurality of video streams provides images of the scene from a plurality of different viewpoints;
identifying a target that is present in the scene, wherein the target is identified based on a determination of a likelihood of being of interest to a viewer of the scene;
determining a trajectory of the target through the plurality of video streams, wherein the determining is based in part on an automated visual analysis of the plurality of video streams;
rendering a volumetric video traversal that follows the target through the scene, wherein the rendering comprises compositing the plurality of video streams;
receiving viewer feedback regarding the volumetric video traversal; and
adjusting the rendering in response to the viewer feedback, wherein the adjusting comprises sending an instruction to a camera instructing the camera to capture images of the scene using a new setting, wherein the new setting comprises at least one of: a zoom setting, a resolution setting, or a lighting setting.

20. The non-transitory computer-readable storage medium of claim 18, wherein the rendering comprises:
selecting a subset of the plurality of video streams that presents the target in a manner consistent with a preference of the viewer; and
performing the compositing using the subset.

* * * * *